United States Patent

Kelley

[15] 3,667,702
[45] June 6, 1972

[54] METHOD AND APPARATUS FOR TRANSPORTING CONTAINERS THROUGH A PNEUMATIC TUBE SYSTEM

[72] Inventor: William E. Kelley, Houston, Tex.
[73] Assignee: C. K. Kelley & Sons, Inc., Houston, Tex.
[22] Filed: Mar. 19, 1970
[21] Appl. No.: 21,143

[52] U.S. Cl. .................................. 243/32, 243/39, 215/12
[51] Int. Cl. ............................................................. B65g 51/06
[58] Field of Search ................................... 243/32–35, 39; 215/12

[56] References Cited

UNITED STATES PATENTS

| | | | |
|---|---|---|---|
| 3,266,751 | 8/1966 | Purdy | 243/35 |
| 1,013,693 | 1/1912 | Steel | 215/12 |
| 1,332,901 | 3/1920 | Jennings | 243/32 |
| 3,188,018 | 6/1965 | Otteeren | 243/35 |
| 3,406,853 | 10/1968 | McLeod | 215/12 |
| 3,241,209 | 3/1966 | Taylor | 215/12 |
| 2,740,544 | 4/1956 | Vaughan | 215/12 |
| 1,870,258 | 8/1932 | MacMillan | 243/35 |

FOREIGN PATENTS OR APPLICATIONS

| | | | |
|---|---|---|---|
| 1,145,555 | 3/1963 | Germany | 243/39 |
| 570,217 | 2/1933 | Germany | 243/35 |

Primary Examiner—Harvey C. Hornsby
Attorney—Michael P. Breston

[57] ABSTRACT

A method of transporting containers through a pneumatic tube system by detachably securing the containers directly to air sealing means prior to insertion in the system. A carrier specifically designed for containers uses the container as the body. The container is held in position by a harness attached to the air sealing means by resilient straps allowing the container to be easily attached to the air sealing means. A carrier having a length of tubing resiliently attached to an air sealing means is also disclosed.

7 Claims, 5 Drawing Figures

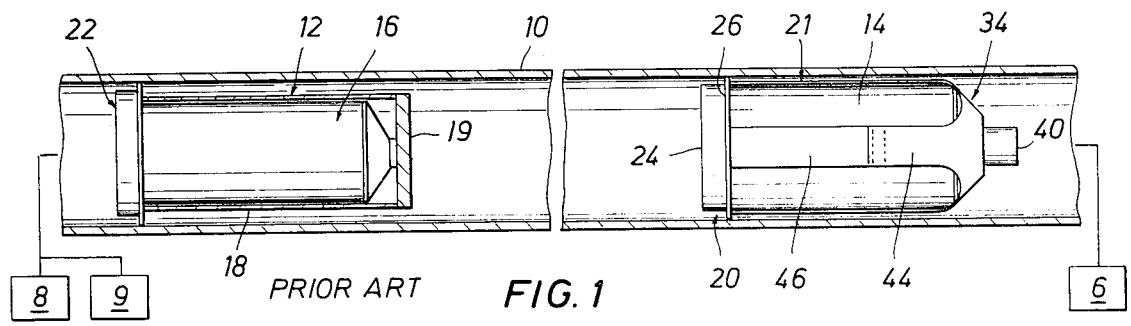
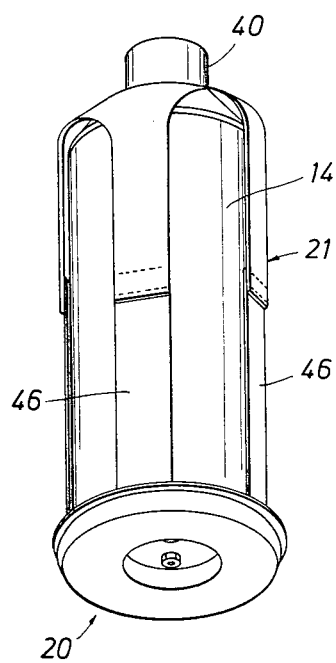
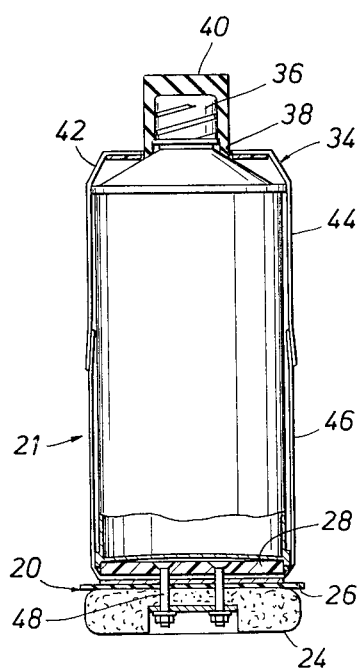
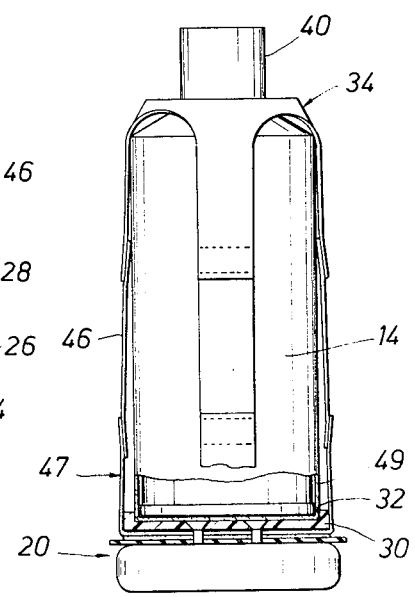
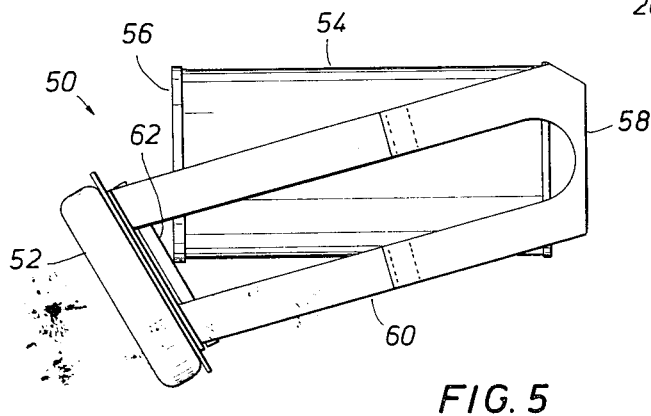

METHOD AND APPARATUS FOR TRANSPORTING CONTAINERS THROUGH A PNEUMATIC TUBE SYSTEM

BACKGROUND OF THE INVENTION

1. Field of the Invention

This invention relates to the transportation of containers in a pneumatic tube system.

2. Description of the Prior Art

For many years pneumatic tube systems have been used to rapidly transport various articles from one point to another. Basically, a pneumatic tube system is formed of a dispatching terminal, a receiving terminal, tubing connecting the terminals, a blower providing the motive force and a carrier containing the articles to be transported. The carrier has air sealing means forming air seal with the inner walls of the tubing and a body which is sized so that it can navigate the various bends and turns in the system. The carrier is placed in the dispatcher and as a result of the combination of suction and pressure, is transported from the dispatcher through the tubing to the receiving terminal. The inner diameter of the tubing is customarily used to specify the size of the pneumatic tube system and generally speaking the size of standard commercial systems vary by inch increments. The size of system is governed by the size of the articles to be transported and the cost of the system increases as the size increases.

Since the carrier has a body in which the article being transported is contained, the effective useable inner diameter of the carrier is considerably smaller than the inner diameter of the tubing. Accordingly, when transporting containers in such a system, the system usually has to be sized considerably larger than the diameter of the container being transported and as a result, the cost of the system is increased. Therefore, it is an object of the present invention to provide a method of transporting containers in a pneumatic tube system which will permit the system to be sized relatively close to the dimensions of the articles being transported.

In refineries it is quite customary to have a continuous flow of samples to the laboratory. In many processes it is desirable to have approximately a quart of the fluid available for testing. In view of the large number of samples, it is very desirable to use economically priced containers, especially since they are normally used only one time. While standard commercial quart containers will fit inside a four inch pneumatic tube system, they will not fit inside a conventional carrier. Therefore, it is an object to provide a novel carrier for the transportation of containers which will carry a container having a diameter approaching the inner diameter of the tubing.

It is another object to provide a pnuematic tube system carrier which utilizes the container being transported as the body of the carrier.

It is a further object to provide a carrier for a pneumatic tube system which has an air sealing means to which is resiliently attached a harness for receiving a container.

It is still another object to provide a pneumatic tube system carrier for containers which has an air sealing means provided with a container positioning means which centers one end of the container relative to the air sealing means and which has a resilient harness securing the other end of the container.

It is still a further object to provide a novel pnuematic tube carrier formed of an air sealing means and a resiliently attached body which is formed of a length of tubing having an open end adjacent to the air sealing means.

SUMMARY OF THE Invention

In order to transport containers in a pneumatic tube system which is sized relatively close to the size of the container, the container is attached to air sealing means by means of a resilient harness. The assembly is then inserted into the system. To assure proper alignment during transportation and to protect the container, the bottom of the container is located in container positioning means attached to the air sealing means and the harness extends over the top of the container to provide a rubbing surface. If the container has an extending cap portion, the harness may have an aperture through which the cap portion can extend. A cover surrounding the aperture protects the cap. It has been found that by using a length of tubing having an open end adjacent to the air sealing means and a closed end distant therefrom and attaching it by resilient means to the air sealing means, an economical carrier may be produced.

BRIEF DESCRIPTION OF THE DRAWINGS

FIG. 1 is a diagrammatic view of a pneumatic tube system having an enlarged cross-section view of a length of tubing illustrating a prior art carrier and a container arranged for transport in accordance with the present invention;

FIG. 2 is an isometric view of the carrier of the present invention having a container positioned therein;

FIG. 3 is a cross-section view of the carrier and container arrangement;

FIG. 4 is a cross-section of the air sealing means having an alternative form of container positioning means; and FIG. 5 is an isometric view of a pneumatic tube system carrier constructed in accordance with the present invention.

DESCRIPTION OF THE PREFERRED EMBODIMENTS

In describing the preferred embodiments of the invention illustrated in the drawings, specific terminology will be resorted to for sake of clarity. However, it is not intended to be limited to the specific terms so selected, and it is to be understood that each specific term includes all technical equivalents which operate in a similar manner to accomplish a similar purpose.

Turning now to the specific embodiments of the invention selected for illustration in the drawings, FIG. 1 illustrates a pneumatic tube system having a dispatching terminal 6, a receiving terminal 8, a blower 9, and a length of pneumatic tubing 10 in which is positioned a prior art carrier 12 and a container 14 arranged for transport by the present invention. Positioned inside carrier 12 is a container 16. As can be readily seen, the diameter and length of container 16 is much smaller than the diameter and length of container 14. The reason for this is that carrier 12 has a body 18, which in addition to being sized of navigate the various turns and bends in the system, has to be of sufficient thickness to provide protection for the material being transported; therefore, the useable inner diameter of carrier 12 is considerably less than the diameter required for easy navigation of the system. Also, due to body 18 having a closure mechanism 19, the useable interior length of carrier 12 is further restricted.

It has been found that with the present invention, a full quart size container having a diameter of 3 ⅝ and a length of 8 7/8 inches which is the standard size of commerciably available quart cans, may be satisfactorily transported in a four inch pneumatic tube system. Whereas the typical carrier for such a system has an effective inside diameter of 2 ¾–2 7.8 inches and an effective length of 14 to 16 ½inches. Obviously, the standard quart container cannot be inserted in such a carrier. In order to transport the standard quart container in a typical pneumatic tube carrier, it would be necessary to increase the size of the pneumatic tube system from a four inch system to a five inch system which results in a substantially increased cost.

Container 14 is detachably secured to an air sealing means 20 of novel carrier 21 and is similar to air sealing means 22 of carrier 12 being formed of a cushioning device which may be an annular felt head 24 and a circular air sealing washer 26. As is well known in the art, the felt head has a diameter slightly smaller than the inner diameter of the tubing and the air washer has a diameter which is approximately the same diameter as the inner diameter of the tubing. Attached to air sealing means 20 is a container positioning means which may be formed of a circular plate 28 of metal or other rigid material sized to engage the bottom of container 14 and hold it firmly relative to the air sealing means. If the bottom of the container does not have a depressed portion which can be engaged by plate 28, a plate 30 having a cut out portion 32 may be used to receive the bottom end of the container, see FIG. 4. In either case, the container positioning means holds the container centered relative to the air sealing means. To secure the container to the air sealing means, a harness 34 is positioned about the top of container 14. Since container 14 has a frusto-conical top end terminating in an extending cap portion 36, the harness is provided with an aperture 38 through which the cap may extend. In such case, the harness may be provided with a cover portion 40 encircling the aperture to provide protection for the cap. To prevent any possibility of the cap from disengaging during the tortuous trip of the container through the system, the interior of the cover may be so constructed and sized so that it engages the cap firmly. The harness may be fabricated from any long wearing flexible material which will generally conform to such a structural One such material is a plastic sold under the trademark "COROFORM." The harness has edge portions 42 which extend over the top and along the side of the container to provide a protective rubbing surface for the assembly as it passes through the tubing. Extending therefrom are tabs 44 to which are attached straps 46 which extend along the sides of the container to the air sealing means. The straps may be made of resilient or elastic material or at least be provided with such a portion so that the harness may be stretched away from the air sealing means to allow the container to be easily attached to or detached from the air sealing means. If desired, instead of attaching the resilient straps directly to the air sealing means, as shown in FIG. 3, the resilient straps may be attached to a harness 47 (see FIG. 4), which may be identical to harness 34 except that it has no cap portion. Threaded members 48 extending through holes in the container positioning means, harness 47 or straps 46, air washer, and felt head hold the assembly together.

While it has been found that the carrier having its harness formed of plastic and attached to the air sealing assembly by elastic straps can handle most samples in refinery service, there are times when it may be desirable to transport a container heated to a temperature which would be deleterious to the material forming the present carrier. In such case the heated container could be placed in a bag 49 formed of heat insulating material such as asbestos prior to positioning the heated container in carrier 21 (see FIG. 4).

While the container illustrated is cylindrical, the invention is not so limited and other shapes of containers may be transported by the use of the present invention. In such cases, the container positioning means will be designed and shaped to engage the bottom of the container and securely hold the container in alignment with air sealing means.

As previously mentioned, the width and length of the container, which may be transported by use of the present invention, is considerably greater than the width and length of container 16, which may be carried by a prior art carrier, without any increase in the overall assembly thereby permitting easy passage through the system. Moreover, carrier 21 takes up a much smaller volume than would be required for typical pneumatic tube carrier 12 and therefore requires less storage space.

It has been found that by using the same principle, an economical carrier 50 can be constructed, see FIG. 5. Carrier 50 has air sealing means 52 which is generally similar to the assembly in FIGS. 2 and 3, and a body 54 which is formed of a length of tubing having an open end 56 which is adjacent the air sealing means and a closed end 58 which is positioned distant therefrom. The body is attached to the air sealing means by a plurality of resilient straps 60 extending from the air sealing means to the closed end of the body. In order to insert an article into the body or withdraw one therefrom, the body is canted with respect to the air sealing means, see FIG. 5. To retain the alignment of the body, body positioning means 62 which receive the open end of the body and hold the body in position relative to the air sealing means, are attached to the air sealing means.

The advantages of this invention lie in the novel and simple means of transporting a container in a pneumatic tube system by detachably securing the container to air sealing means having a resiliently attached harness with the bottom of the container being held centered relative to the air sealing means. With such assembly, various types and shapes of containers can be transported with ease having a size relatively close to that of the inner diameter of the tubing.

It is to be understood that the forms of the invention herewith shown and described is to be taken as preferred embodiments. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the following claims.

What I claim is:

1. A carrier for transporting a generally cylindrical container in a pneumatic tube system, the container having a circular bottom end with a depressed portion and a top end which is provided with an extending cap portion, and carrier comprising:
    air sealing means formed of an annular felt head having a diameter smaller than the inner diameter of the tubing and a circular air seal having a diameter approximately the same size as the inner diameter of the tubing;
    container positioning means attached to the air sealing means for engaging the depressed portion of said bottom end of the container, the container forming the body of the carrier;
    a harness for engaging the top end of the container, the harness having a cap-receiving portion which receives the cap portion of the container, the harness also having portions extending over the shoulder formed between the cylindrical side walls and the top end of the container to provide protective rubbing surfaces; and
    a plurality of straps extending between the air sealing means and the harness, each strap having a resilient portion whereby the straps can be stretched to permit the container to be engaged by or disengaged from the harness by sliding the container between the straps.

2. The carrier specified in claim 1 wherein the interior of the cap receiving portion engaging the cap to prevent its disengagement during the tortuous trip of the container through the system.

3. A carrier for a pneumatic tube system comprising: air sealing means formed of an annular felt head having a diameter smaller than the inside diameter of the tubing and a circular air washer approximately the same diameter as the inside diameter of the tubing;
    a body portion formed of a length of tubing having an open end adjacent to the air sealing means and a closed end positioned distant therefrom; and
    a plurality of straps extending from the air sealing means to the closed end of the body, each of the straps having a resilient portion whereby the body may be canted relative to the air sealing means to expose the open end permitting articles to be inserted into or withdrawn from the body.

4. The carrier specified in claim 3 wherein there is body positioning means attached to the air sealing means to position the body relative to the air sealing means.

5. The carrier specified in claim 1 and further including a heat insulation bag into which the container is inserted prior to its incorporation into the carrier.

6. The carrier specified in claim 1 in which the container positioning means is formed of a circular member of a smaller diameter than the annular felt head and adapted to be positioned in the depressed portion of the bottom end of the container.

7. The carrier specified in claim 1 in which the container positioning means is formed of a member having an annular recess adapted to receive the bottom end of the cylindrical container.

* * * * *